April 20, 1948. G. E. DATH 2,439,843
FRICTION SHOCK ABSORBING MECHANISM FOR RAILWAY DRAFT RIGGINGS
Filed May 19, 1944
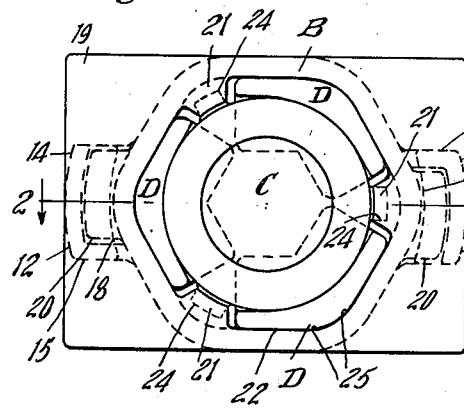
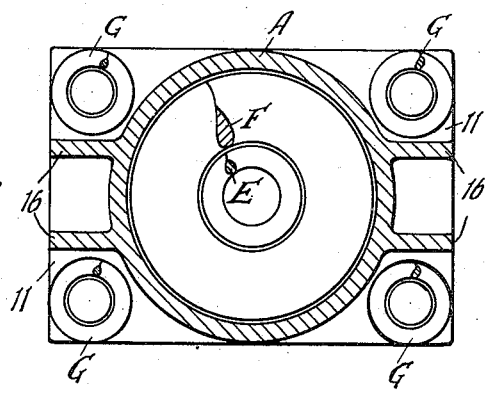
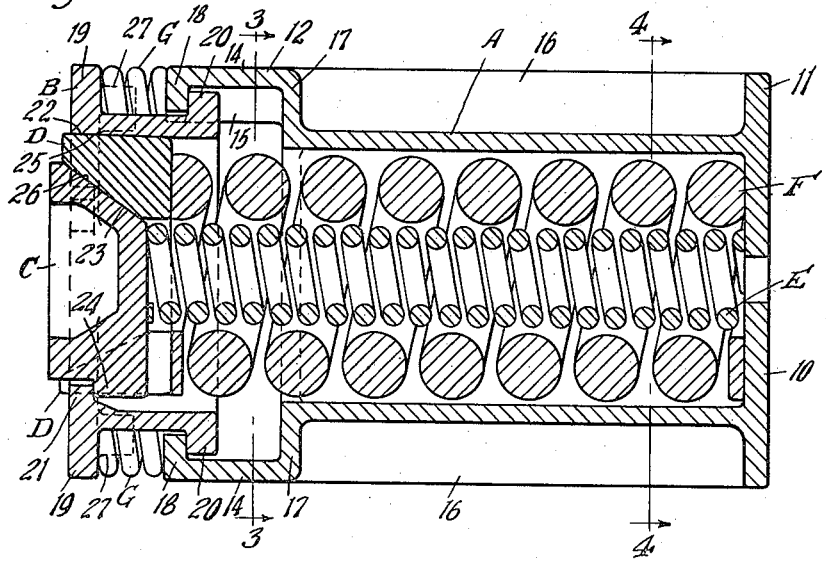
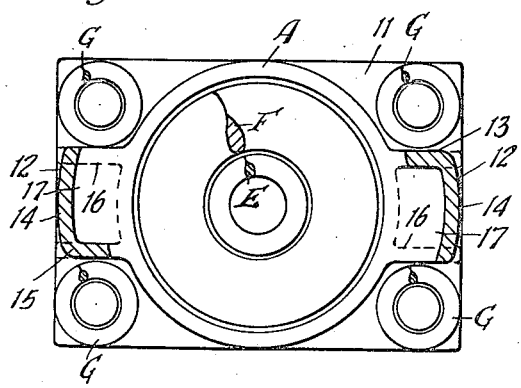
Inventor
George E. Dath
By Henry Fuchs.
Atty.

Patented Apr. 20, 1948

2,439,843

UNITED STATES PATENT OFFICE 2,439,843

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application May 19, 1944, Serial No. 536,326

8 Claims. (Cl. 213—24)

This invention relates to improvements in friction shock absorbing mechanisms, especially adapted for use in connection with railway draft riggings.

One object of the invention is to provide a friction shock absorbing mechanism having preliminary spring action to absorb the lighter shocks to which the mechanism is subjected, followed by high combined frictional and spring resistance to absorb the heavier shocks.

A further object of the invention is to provide a friction shock absorbing mechanism of the character indicated, comprising a spring cage and a relatively movable friction shell connected to the spring cage, a friction clutch slidably telescoped within the friction shell, spring means within the spring cage yieldingly opposing inward movement of the friction shell with respect to the cage and inward movement of the friction clutch with respect to the shell, wherein additional spring means disposed about the cage is provided for resisting inward movement of the friction shell with respect to the cage, thereby materially increasing the spring capacity of the mechanism.

A more specific object of the invention is to provide a friction shock absorbing mechanism, as set forth in the preceding paragraph, wherein the friction shell and spring cage have interlocking anchoring means for connecting the shell to the cage, which means is interlocked by relative angular rotation of the shell and cage, and wherein the spring means which surrounds the cage comprises a plurality of longitudinally disposed coil springs held against bodily rotation about the cage and interengaged with means on the friction shell to hold the latter against rotary displacement with respect to the cage and thereby prevent accidental unlocking and separation of the shell from the cage.

Other objects of the invention will more clearly appear from the description and claims hereinafter following.

In the drawing forming a part of this specification, Figure 1 is a front elevational view of my improved shock absorbing mechanism. Figure 2 is a horizontal, longitudinal sectional view, corresponding substantially to the line 2—2 of Figure 1. Figures 3 and 4 are transverse, vertical sectional views, corresponding respectively to the lines 3—3 and 4—4 of Figure 2.

As shown in the drawing, my improved friction shock absorbing mechanism comprises broadly a spring cage A; a friction shell B having a lost motion connection with the cage; a central wedge block C; three friction shoes D—D—D; inner and outer spring resistance members E and F within the cage A; and four additional springs G surrounding the cage.

The spring cage A is in the form of a substantially cylindrical shell closed at the rear end by a vertical, transverse wall 10, which is extended laterally at opposite sides beyond the shell to form follower flanges 11—11, the rear wall 10 and the flanges 11—11 thus, in effect, forming a complete rear follower member. At the forward end the cage A is laterally enlarged, at opposite sides, as indicated at 12—12, providing, in effect, wing members. The wing member 12 at the right hand side of the cage comprises a horizontal, longitudinally extending, top wall 13 and a vertically extending, curved, outer wall 14. The wing 12 at the left hand side of the spring cage, as viewed in Figure 3, comprises a horizontally disposed, longitudinally extending, bottom wall 15 and a vertically extending, curved, outer wall, which is also indicated by 14. The wings 12—12 are at diametrically opposite sides of the cage and the wing at the right hand side is open at the bottom, while the wing at the left hand side is open at the top. Rearwardly of the wings 12—12 the spring cage is reenforced by longitudinally extending, vertically spaced, exterior, parallel webs 16—16. The upper web 16 at the right hand side of the cage, as viewed in Figure 3, is in alignment with the wall 13 of the wing 12 at that side of the cage, and the lower web 16 on the left hand side of the cage is in alignment with the bottom wall 15 of the wing at the left of the cage. The top and bottom webs 16—16 at the opposite sides of the cage are respectively in horizontal alignment. The pairs of webs 16—16 at opposite sides of the spring cage form, in effect, continuations of the wings 12—12. At the front ends of the webs 16—16, at each side of the cage, transverse partition walls 17—17 are provided, which occupy the space between said top and bottom webs and form rear end walls for the wing sections 12—12. At the front ends of the walls 14—14 of the wings 12—12 are provided inwardly extending, short walls or flanges 18—18. As will be evident, the walls of the wings 12—12 define pockets at opposite sides of the cage adapted to receive locking means on the inner end of the friction shell B, the front and rear walls 18 and 17 of said wings forming, in effect, stop lugs for limiting lengthwise movement of the shell with respect to the spring cage.

The friction shell B is of hexagonal, transverse cross section and has a lateral outwardly extending flange 19 of rectangular outline at the forward end thereof, corresponding in size to the rear follower of the spring cage which is formed by the flanges 11—11. At the rear end, the friction shell is provided with a pair of laterally outwardly projecting lugs 20—20 at opposite sides thereof which are adapted to engage in back of the walls 18—18 of the spring cage to anchor the shell to the cage. At the forward end, the shell B is provided with three inturned lugs 21—21—21 which cooperate with the wedge block C, as hereinafter pointed out, to anchor the block to the friction shell. The shell B presents three interior friction surfaces 22—22—22 of V-shaped, transverse cross section. The friction surfaces 22—22—22 converge inwardly of the shell. The lugs 21—21—21 at the outer end of the friction shell are alternated with the friction surfaces thereof, that is, a lug 21 is located between each two adjacent friction surfaces.

The wedge C comprises a hollow block having a flat front end face which is adapted to engage the front follower of the railway draft rigging and receive the actuating force. At the inner end, the block C is provided with three flat wedge faces 23—23—23 which converge inwardly of the mechanism. The wedge block C is further provided with three laterally projecting retaining lugs or arms 24—24—24 which are disposed respectively between the three wedge faces of the block and extend between adjacent shoes. The lugs 24—24—24 are adapted to engage in back of the retaining lugs 21—21—21 of the friction shell B, thereby restricting outward movement of the wedge block with respect to the shell.

The friction shoes D are three in number and surround the wedge block C. Each shoe D has a longitudinally extending, friction surface 25 on the outer side thereof, which is of V-shaped, transverse section and has sliding engagement with one of the V-shaped friction surfaces 22 of the friction shell. On the inner side, each shoe has a flat wedge face 26, which is in engagement with one of the wedge faces 23 of the wedge block C and correspondingly inclined thereto.

The inner and outer springs E and F are disposed within the spring cage A, the spring F being heavier than the inner coil spring E. The spring E has its front and rear ends bearing respectively on the inner end of the wedge block C and the rear wall 10 of the cage, and the outer spring F has its front and rear ends bearing respectively on the inner ends of the shoes and said rear wall 10.

The springs G are four in number and surround the spring cage A. Each spring G is in the form of a helical coil extending lengthwise of the mechanism and interposed between the follower flange 19 of the friction shell and the flange 11 of the spring cage. The springs G are arranged in pairs at opposite sides of the spring cage, the members of each pair being disposed respectively above and below the webs 16—16 at the corresponding side of the spring cage. As will be evident, the springs G—G—G—G are, in effect, locked against rotary displacement around the spring cage by the webs 16—16 and 16—16 which, in effect, form separating wings. The follower flange 19 of the friction shell B is provided with four rearwardly projecting springs centering bosses 27—27—27—27, which are arranged in pairs at opposite sides of the mechanism and engage within the front end portions of the corresponding helical coil springs G—G to lock the friction shell and springs G—G and G—G against relative rotary displacement about the central longitudinal axis of the mechanism.

In assembling my improved shock absorbing mechanism, the coil springs E and F are first placed within the spring cage and the friction shell is then attached to the cage by arranging the same so that the lugs 20—20 are angularly offset with respect to the lugs or front walls 18—18 of the spring cage A so as to clear the latter, and forcing the shell rearwardly until the lugs 20—20 are disposed inwardly of the walls or lugs 18—18, and then slightly rotating the friction shell with respect to the cage to bring the lugs 20—20 in back of the lugs or walls 18—18. After the friction shell has been assembled with the spring cage, the friction shoes are placed against the outer end of the spring F and forced inwardly to an extent that, when the wedge C is entered into the front end of the friction shell, the retaining lugs 24—24—24 thereof will clear the front ends of the shoes. With the shoes held in this position the wedge is applied and rotated to bring the lugs 24—24—24 thereof in alignment with and in back of the lugs 21—21—21 of the friction shell. The four outer springs G—G—G—G are then placed in position between the follower flange 19 of the friction shell and the flanges 11—11 of the spring cage, the same being first compressed so as to shorten the overall length thereof to clear the inner ends of the spring centering bosses 27—27—27—27 of the flange 19. After the springs G—G—G—G have been placed in position above and below the webs 16—16 and 16—16 of the spring cage, the same are permitted to expand and engage over the bosses 27—27—27—27, thus effectively locking the friction shell against rotation with respect to the spring cage and preventing relative rotary displacement of the lugs 20—20 and 18—18.

The operation of my improved friction shock absorbing mechanism is as follows: Upon the mechanism being compressed, the wedge member is forced rearwardly toward the spring cage A and inwardly of the friction shell B, wedging the friction shoes D—D—D apart into tight frictional engagement with the friction surfaces of the friction shell B. Due to the friction thus produced between the shoes, the friction shell, shoes, and wedge move inwardly in unison during the initial compression of the mechanism against the resistance of the springs E, F, and G. As will be evident, the initial action is thus purely spring resisted. This action continues until the lugs 20—20 at the rear end of the shell B engage the walls or lugs 17—17 of the spring cage, whereupon movement of the shell is positively arrested and the wedge and friction shoes are compelled to move inwardly with respect to the friction shell B against the resistance of the springs E and F, thereby setting up high frictional resistance during the remainder of the compression stroke of the mechanism. When the actuating force is reduced, the expansive action of the springs E, F, and G restores all of the parts to their normal full release position as shown in Figure 2, outward movement of the friction shell being arrested by its shouldered engagement with the spring cage and outward movement of the wedge being arrested by engagement of the lugs 24—24—24 thereof with the lugs 21—21—21 of the shell.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage; of a friction shell having lost motion connection with the spring cage comprising cooperating anchoring means on said shell and cage engageable by relative rotary displacement thereof; a friction clutch slidingly telescoped within the friction shell; spring means within the spring cage opposing lengthwise inward movement of the clutch and friction shell; and additional spring means disposed about said cage opposing inward movement of the shell; and means on said shell and cage interlocking with the last named spring means holding said shell and cage against relative rotary displacement.

2. In a friction shock absorbing mechanism, the combination with a spring cage provided with lengthwise extending, exterior webs; of a friction shell having lost motion connection with the spring cage comprising cooperating anchoring members on said shell and cage engageable by relative rotary displacement thereof, said shell having a laterally projecting spring follower flange provided with spring centering bosses; a friction clutch slidingly telescoped within the friction shell; spring means within the cage opposing lengthwise inward movement of the clutch and shell with respect to the cage; and longitudinally extending, helical coil springs disposed about said cage and having lateral bearing engagement with said lengthwise extending webs to hold said springs against rotary displacement about the central longitudinal axis of the mechanism, the front ends of said helical springs being seated over the centering bosses of the follower flange of said shell to lock said shell against rotation with respect to said springs and the spring cage.

3. In a friction shock absorbing mechanism, the combination with a tubular spring cage; of a friction shell having lost motion connection with the spring cage comprising cooperating anchoring members having shouldered engagement with each other, said members being brought into shouldered engagement by relative rotary displacement thereof, said shell having a laterally projecting spring follower flange provided with spring centering bosses; a friction clutch slidingly telescoped within the cage; spring means within the cage opposing lengthwise inward movement of the clutch and shell; lengthwise extending, laterally projecting, exterior shoulders on the cage; and longitudinally arranged, exterior coil springs disposed about said cage extending lengthwise of said shoulders and adjacent thereto to hold said springs against rotary displacement with respect to said cage about the longitudinal central axis of the mechanism, said last named springs opposing inward movement of the shell and bearing at their front ends on said spring follower flange of the shell with said centering bosses engaged in the front ends of said coil springs to hold said shell against rotation with respect to said spring and spring cage.

4. In a friction shock absorbing mechanism, the combination with a tubular spring cage having longitudinally extending, outwardly projecting, central webs at opposite sides thereof, and a laterally projecting follower member at the rear end; of a friction shell having a lost motion connection with the spring cage comprising anchoring lugs engageable in back of each other by relative rotary displacement of said shell and cage, said shell having a laterally projecting follower at the front end provided with rearwardly extending centering bosses; a friction clutch slidingly telescoped within the cage; spring means within the cage opposing inward movement of the clutch and shell; and a pair of longitudinally extending coil springs exterior to the cage at each side of the latter, interposed between, and bearing at opposite ends on, said follower flange of the shell and the follower member of the cage, the springs of each pair embracing the web at the corresponding side of the cage at its top and bottom sides to hold said springs against bodily rotary displacement about the central longitudinal axis of the mechanism, said springs having the front end portions thereof telescoped over the spring centering bosses of said follower flange of the shell to hold the latter against rotation with respect to the cage.

5. In a friction shock absorbing mechanism, the combination with a tubular spring cage having laterally projecting, longitudinally extending, exterior wings at opposite sides thereof, and a laterally projecting follower member at the rear end; of a friction shell having a lost motion connection with the spring cage, comprising longitudinally spaced front and rear lugs at opposite sides of said cage, and a pair of lugs projecting from opposite sides of the shell and engaged between said front and rear lugs of the cage, said shell being rotatably displaceable with respect to the cage to engage the lugs of the former between the lugs of the latter, said shell having a laterally projecting follower flange at the front end; a friction clutch slidably telescoped within the friction shell; springs within the cage yieldingly opposing inward movement of said clutch and shell; longitudinally extending coil springs exteriorly of the cage disposed above and below said wings to hold said springs against rotation about the longitudinal central axis of the mechanism, said springs bearing at their front and rear ends on the follower flange of the shell and the follower member of the cage respectively; and centering bosses on said follower flange seated within the front ends of said coil springs to lock said shell against rotation with respect to said springs and hold said shell against rotation with repect to the spring cage.

6. In a friction shock absorbing mechanism, the combination with a spring cage provided with lengthwise extending, exterior webs; of a friction shell having lost motion connection with the spring cage comprising cooperating anchoring members on said shell and cage engageable by relative rotary displacement thereof, said shell having a laterally projecting spring follower flange provided with spring centering bosses; a central wedge block; friction shoes surrounding said block and slidably engaging the interior walls of the shell, said shell and wedge block having shouldered engagement with each other to limit outward movement of said block; spring means within the cage yieldingly opposing inward movement of the shoes and wedge; and longitudinally extending helical coil springs disposed about said cage opposing inward movement of the shell, and having lateral bearing engagement with said lengthwise extending webs to hold said springs and cage against relative rotation about the central longitudinal axis of the mechanism, the front ends of said helical springs being seated over the centering bosses of the follower flange of said shell to hold said shell and springs against relative rotary displacement about the central longitudinal axis of the mechanism.

7. In a friction shock absorbing mechanism, the combination with a tubular spring cage having longitudinally extending, outwardly projecting, central webs at opposite sides thereof, and a laterally projecting follower member at the rear end; of a friction shell having a lost motion connection with the spring cage comprising anchoring lugs engageable in back of each other by relative rotary displacement of said shell and cage, said shell having a laterally projecting follower at the front end provided with rearwardly extending centering bosses; a central wedge block; friction shoes surrounding said block and slidably engaging the interior walls of the shell, said shell and wedge block having shouldered engagement with each other to limit outward movement of said block; spring means within the cage yieldingly opposing inward movement of the shoes and wedge; and longitudinally extending coil springs exterior to the cage, interposed between, and bearing at opposite ends on, said follower flange of the shell and the follower member of the cage, said springs embracing said webs at the top and bottom sides to hold said springs against rotation with respect to the cage about the central longitudinal axis of the mechanism, the front end portions of said springs being telescoped over the spring centering bosses of said follower flange of the shell to hold said shell and said springs against relative rotary displacement about the longitudinal central axis of the mechanism.

8. In a friction shock absorbing mechanism, the combination with a tubular spring cage; of a friction shell having lost motion sliding connection with the cage comprising cooperating anchoring members having shouldered engagement with each other, said members being brought into shouldered engagement by relative rotary displacement thereof about the central longitudinal axis of the mechanism, said shell having a laterally projecting spring follower flange; a friction clutch slidingly telescoped within the shell; spring means within the cage opposing inward movement of the clutch and shell; and means for locking said shell and cage against relative rotation about the longitudinal central axis of the mechanism comprising lengthwise extending, helical coil springs having shouldered engagement with said spring cage and follower flange of the shell respectively to hold said springs against rotation about said cage and, in turn, hold said shell against rotation with respect to said springs about the central longitudinal axis of the mechanism.

GEORGE E. DATH.

REFERENCES CITED

The following references are of record in the file of this patent:

UNITED STATES PATENTS

| Number | Name | Date |
| --- | --- | --- |
| 1,169,826 | Peycke | Feb. 1, 1916 |
| 1,700,260 | Hazeltine | Jan. 29, 1929 |
| 1,753,937 | Nash | Apr. 8, 1930 |
| 1,871,451 | Geiger | Aug. 16, 1932 |
| 1,971,420 | Lounsbury | Aug. 28, 1934 |
| 2,238,083 | Sproul | Apr. 15, 1941 |
| 2,277,881 | Olander | Mar. 31, 1942 |
| 2,291,831 | Olander | Aug. 4, 1942 |
| 2,354,826 | Olander | Aug. 1, 1944 |